(No Model.)

G. M. SLAUGHTER & F. CHRISTIAN.
GRASS BURNING DEVICE.

No. 599,872. Patented Mar. 1, 1898.

Witnesses

Inventors
Georg M. Slaughter
Fred Christian
By H. B. Willson
Attorney

THE NORRIS PETERS CO., PHOTO-LITHO., WASHINGTON, D. C.

UNITED STATES PATENT OFFICE.

GEORGE M. SLAUGHTER AND FRED CHRISTIAN, OF RUNNING WATER, TEXAS.

GRASS-BURNING DEVICE.

SPECIFICATION forming part of Letters Patent No. 599,872, dated March 1, 1898.

Application filed April 23, 1895. Serial No. 546,868. (No model.)

*To all whom it may concern:*

Be it known that we, GEORGE M. SLAUGHTER and FRED CHRISTIAN, citizens of the United States, residing at Running Water, in the county of Hale and State of Texas, have invented certain new and useful Improvements in Grass-Burning Devices; and we do declare the following to be a full, clear, and exact description of the invention, such as will enable others skilled in the art to which it appertains to make and use the same.

Our invention relates to grass-burning devices, and more particularly to a device for burning the grass on prairies.

The object of the invention is to provide a device of this character by which the grass may be safely burned on the prairies and the fire kept from spreading, and also to provide a device of this character which will be simple of construction, durable in use, and comparatively inexpensive of production.

With these objects in view the invention consists in certain features of construction and combination of parts, which will be hereinafter fully described and claimed.

Figure 1:
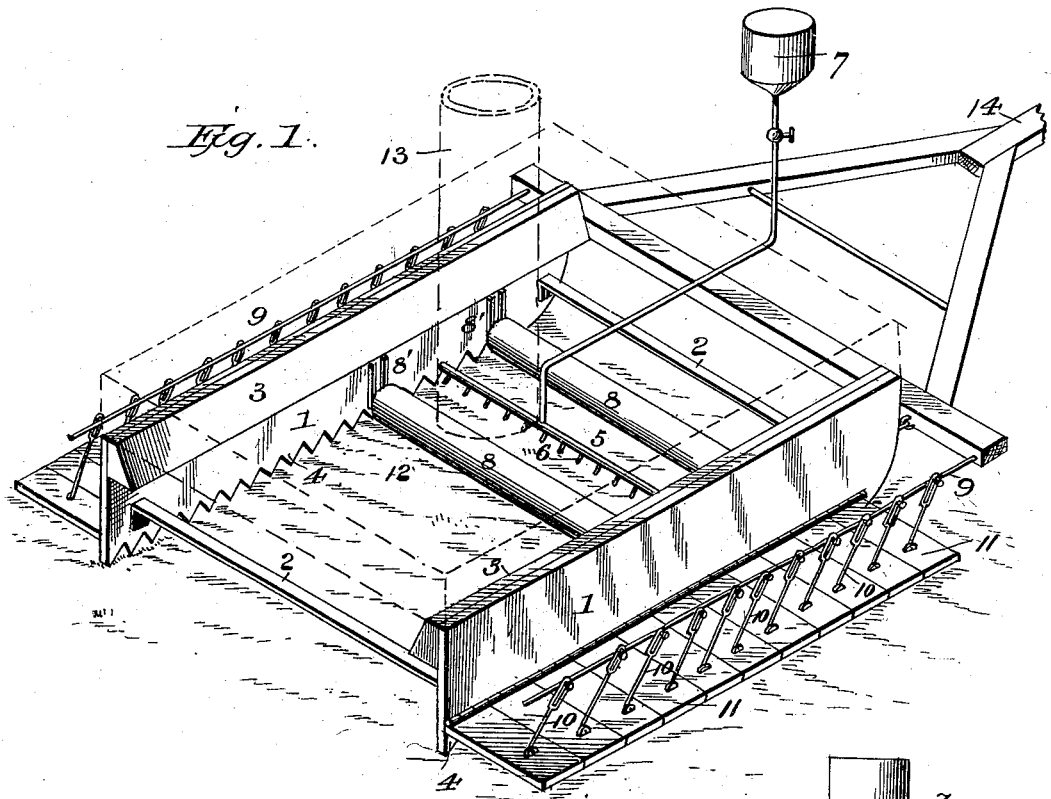
Figure 2:
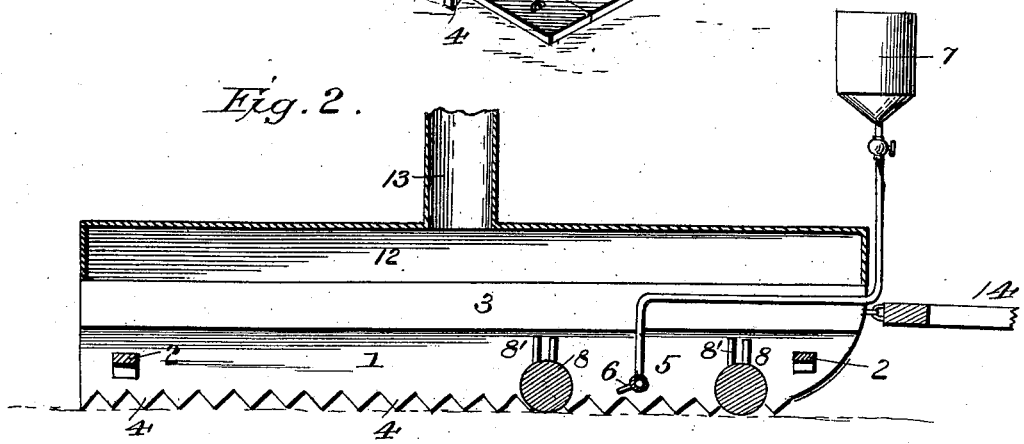

In the drawings, Figure 1 is a perspective view of our improved grass-burner with a portion of the hood broken away to more clearly illustrate the invention. Fig. 2 is a cross-sectional view. Fig. 3 is a longitudinal vertical sectional view.

1 denotes the sides of our burner, which consist of longitudinal runner-plates connected by metallic cross-bars 2. The inner sides of these plates have secured to them water-chambers 3 to reduce to a minimum the heating of the plates. The plates are provided at their lower edges with cutters 4. (Shown in the present instance as serrated or saw-toothed.) Extending across and secured to the plates near their front ends is a burner-pipe 5, having a series of burners 6. These burners are supplied with a hydrocarbon oil from a tank 7, suitably supported upon the frame.

Journaled in front and to the rear of the burners are rollers 8, which have a free vertical movement in their bearings 8'. These rollers are for the purpose of protecting the flames of the burners from strong air-currents, which may pass under the device and would otherwise extinguish the flames, while owing to their free vertical movement they will be allowed to pass over obstructions which may be encountered without injury to the device.

Attached to the front cross-bar are drag-bars 9, from which are suspended by pivoted links 10 on each side of the plates what we term "beaters" 11, which are blocks lying close to the edge of the plates and bent to beat out or extinguish any burning grass which may catch on the outside of the plates.

12 denotes a hood which covers the top of the device and is provided with a smoke-stack 13.

14 denotes a tongue which is connected to the front cross-bar and by means of which the device is drawn.

In operation the device is drawn along over the grass to be burned, and the burners coming in contact with the grass will ignite it and the flames will be confined between the runner-plates by reason of the cutters, which will dig into the sod and separate the grass between the plates from the grass on the outside thereof; but should the grass on the outside in any possible manner catch fire the beaters, which have a free vertical movement and which will follow the various undulations of the ground, will positively stamp or beat out the fire, thereby overcoming any liability of the fire spreading.

This device is found very useful on the prairies and enables the residents to clear the grass around their dwellings, thereby protecting their homes from conflagration should the prairie catch fire.

From the foregoing description, taken in connection with the accompanying drawings, the operation of the invention will be readily understood.

By providing the runners with water-chambers they are protected from becoming heated to a red heat, which would cause the grass against which the outer sides of the runners come in contact being ignited.

What we claim, and desire to secure by Letters Patent of the United States, is—

1. The combination with longitudinal runners spaced apart having cutters at their lower edges, and of a burner supported between said runners, substantially as set forth.

2. The combination with longitudinal runners spaced apart, of a burner supported between said runners, and of vertical movable beaters supported at the outer sides of said runners, substantially as set forth.

3. The combination with longitudinal runners spaced apart, a burner supported between said runners and water-chambers secured to the inner sides of said runners, substantially as set forth.

4. The combination with longitudinally-spaced-apart runners, a burner supported between said runners, cutters formed or secured to the lower edges of said runners and vertically-movable beaters suitably supported at the outer sides of said runners, substantially as set forth.

In testimony whereof we affix our signatures in presence of two witnesses.

GEO. M. SLAUGHTER.
FRED CHRISTIAN.

Witnesses:
R. P. SMYTH,
DENNIS RICE.